(12) United States Patent
Kurokawa et al.

(10) Patent No.: US 6,459,494 B1
(45) Date of Patent: Oct. 1, 2002

(54) WIDTH MEASURING APPARATUS

(75) Inventors: Koshu Kurokawa; Youichi Hayata; Akihiro Hashimoto, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/506,805

(22) Filed: Feb. 18, 2000

(30) Foreign Application Priority Data

Feb. 18, 1999 (JP) .......................................... 11-039973

(51) Int. Cl.[7] .............................................. G01B 11/04
(52) U.S. Cl. ...................... 356/637; 356/638; 356/429
(58) Field of Search ................................ 356/635, 637, 356/638, 639, 640, 429

(56) References Cited

U.S. PATENT DOCUMENTS

| 3,746,451 A | * | 7/1973 | Croissant et al. | ............ | 356/638 |
| 4,260,260 A | * | 4/1981 | Letort et al. | ................ | 356/638 |
| 4,978,223 A | * | 12/1990 | Kutchenriter et al. | ....... | 356/637 |

FOREIGN PATENT DOCUMENTS

| JP | 7-182724 | 7/1995 | ........... | G11B/15/00 |
| JP | 8-327330 | 12/1996 | ........... | G01B/11/04 |

* cited by examiner

*Primary Examiner*—Richard A. Rosenberger
(74) *Attorney, Agent, or Firm*—Sughrue Mion, PLLC

(57) ABSTRACT

The width measuring apparatus according to this invention includes a light emitting element, a pair of light receiving elements, a measurement support table for fixing them and calculating device, where a pair of partial laser beams of the laser beam from the light emitting element which are not projected over a traveling elongated object to be measured are received by the light receiving elements, and a width of the elongated object calculated from the received light quantities of the pair of partial laser beams. The width measuring apparatus according to this invention further includes a single light emitting element, pairs of light receiving elements, a measurement support table for fixing and calculating devise, where pairs of partial laser beams of the laser beams from the light emitting element which are not projected over traveling elongated objects are received by the light receiving elements, and widths of the elongated objects are calculated from light quantities of the received partial laser beams. Based on the apparatus, it can continuously and optically measure the width of the object in a non-contact fashion with a less amount of measuring error, and measure the widths of the objects at a less expensive cost, securing a working space.

10 Claims, 6 Drawing Sheets

WIDTH MEASURING APPARATUS

BACKGROUND OF THE INVENTION

The present invention relates to the technical field of a width measuring apparatus for measuring widths and changes of the width of an elongated object to be measured which travels at a high speed. More specifically, the present invention relates to the technical field of a tape width measuring apparatus for measuring that a wide tape raw material is slit to a predetermined width when it is slit by a slitter.

Conventionally, there are known magnetic tape slitter apparatuses for slitting a wide raw material to several tens of magnetic tapes to one hundred and several dozens of magnetic tapes, which are used in magnetic recording and reproducing apparatuses such as tape recorders, VTRs and the like and for winding them as respective magnetic tapes. Tape width measuring apparatuses for optically measuring changes of the width of a magnetic tape slit by a magnetic tape slitter apparatus have been known by Model ZDR, manufactured by Kosaka Kenkyusho and the like and described as prior arts in Japanese Unexamined Patent Publications Nos. 7-182724, 8-327330 and 8-327330.

However, since the tape width measuring apparatuses disclosed in Japanese Unexamined Patent Publications Nos. 7-182724 and 8-327330 are arranged to measure changes of the width of a tape which has been slit by a slitter apparatus and wound, independently of the slitter apparatus, they do not measure the width of the tape in a processing line just after it is slit by the slitter apparatus.

Further, Japanese Unexamined Patent Publication No. 8-327330 describes that "while such a conventional measuring apparatus can be applied to existing magnetic tape width measuring apparatuses without any difficulty, it cannot be applied to a magnetic tape width measuring apparatus used for a magnetic tape having a higher signal recording density because the allowable range of the degree of straightness of the tape side edge thereof is narrower (a middle part of the sentence is omitted)". Thus, Model ZDR cannot be applied to the measurement of such a tape. "As to the cyclic changes of the degree of straightness of the tape side edge, since the conventional apparatus observes it at a cycle of about 100 mm along the tape side at the best, the apparatus is less reliable to the degree of straightness changes in a shorter cycle".

These conventional technologies can achieve relatively high measuring accuracy when the changes of the width, and the like of a tape, which is in a stationary state or travels slowly, are measured. However, it is difficult for the laser length measuring devices, which are used in these conventional technologies, to simultaneously measure a multiplicity of objects to be measured, which are located in a narrow region, such as magnetic tapes slit by a slitter from a wide raw material to several tens to one hundred and several dozens of tapes in a processing line. The reason is that the laser length measuring devices are considerably large in size. Accordingly, it is substantially impossible for the devices to continuously measure all the objects to be measured in a processing line.

The laser length measuring device (laser outside diameter measuring device) used as the tape width measuring apparatus is relatively expensive. Accordingly, an enormous expense is required to measure the width of respective tapes having been slit to several tens to hundred and dozens of pieces in the processing line. On the other hand, when less expensive laser elements and photodiodes are used, it is difficult to stably measure tape width because a measurement error is increased due to the thermal drift of output voltages caused by heat.

In addition, the laser length measuring device and, in particular, the laser outside diameter measuring device scan projected laser beams in the width direction of a tape. Thus, when the tape travels at a high speed, a tape width is measured at only two points in the scanning of the laser beams executed in one cycle. Therefore, the tape width is measured substantially in a sampling cycle and cannot be continuously measured. Moreover, in the tape traveling at the high speed, the width thereof cannot be correctly measured because the measuring points of the tape in lengthwise direction thereof are different on a right side edge and a left side edge of the tape.

A more appropriate technology has been desired for the measurement of a tape which travels at a high speed just after it is slit by a slitter apparatus.

SUMMARY OF THE INVENTION

A first object of the present invention is to eliminate the problems of the conventional technologies and to provide a width measuring apparatus which can continuously and optically measure the width of an elongated object to be measured in a non-contact fashion with a less amount of measuring error without using an expensive laser length measuring device, in particular, an expensive laser outside diameter measuring device, and to provide a width measuring apparatus, for example which can be applied in a slitter and the like used for magnetic tapes traveling at a high speed even if a multiplicity of the magnetic tapes, are located in a narrow region.

Further, a second object of the present invention is to eliminate the problems of the conventional technologies and to provide a width measuring apparatus which can be manufactured at a less expensive cost and can continuously and optically measure the width of an elongated object to be measured, for example, the width in a non-contact fashion with a less amount of error without using an expensive laser length measuring device, in particular, an expensive laser outside diameter measuring device while securing a working space where an operator can perform a job even if a multiplicity of the magnetic tapes, for example, are located in a narrow region.

To achieve the above first object, a first aspect of the present invention provides a width measuring apparatus which comprises; a light emitting element located on one side of a traveling elongated object to be measured for projecting. a laser beam over a range wider than a width of the elongated object to be measured in a width direction thereof; a pair of light receiving elements located on another side of the elongated object for respectively receiving each of a pair of partial laser beams of the laser beam at both edge portions of the laser beam from the light emitting element, the partial laser beams, passing by the elongated object without being shaded by the elongated object, and for detecting light quantities of the received partial laser beams; a measurement support table for fixing the light emitting element and the pair of light receiving elements as one set; and a calculating device for calculating the width of the elongated object from the light quantities received by the pair of light receiving elements.

It is preferable that the laser beam from the light emitting element is expanded in a fan shape.

The width measuring apparatus preferably comprises a calibration device for calibrating the light receiving elements, and more preferably the calibration device includes a calibration gauge having a predetermined width for calibrating the light receiving elements, in such a manner that after the light emitting element and the pair of light receiving elements are moved together to a calibrating position where the calibration gauge is disposed and positioned thereat, the light receiving elements respectively receive each of a pair of partial laser beams of the laser beam at both edge portions of the laser beam from the light emitting element, the partial laser beams, passing by the calibration gauge without being projected over the calibration gauge.

It is preferable that the calculating device measures the width of the elongated object to be measured by adding the respective light quantities received by the pair of light receiving elements.

Further the width measuring apparatus preferably comprises cupping removing bars for removing the cupping of the elongated object to be measured in travel, and provided forward and backward of the measurement support table, on which the light emitting element and the pair of light receiving elements are fixed, in the traveling direction of the elongated object to be measured.

And a first aspect of the present invention also provides: a width measuring apparatus, which comprises a plurality of sets of light emitting elements and pairs of light receiving elements, each set of which includes a light emitting element and pairs of light receiving elements in correspondence to an elongated object of a plurality of the elongated objects to be measured, wherein the light emitting element of is located on one side of the elongated object for projecting a laser beam over a range wider than a width of the elongated object to be measured in a width direction thereof, and the pair of the light receiving elements is located on located on another side of the elongated object for respectively receiving a pair of partial laser beams of the laser beam at both edge portions of the laser beam from the light emitting element, the partial laser beams, passing by the elongated object without being shaded by the elongated objects, and for detecting light quantities of the received partial laser beams; a measurement support table for fixing the sets of light emitting elements and pairs of light receiving elements in parallel with each other in correspondence to the respective ones of the plurality of the elongated objects which travel in parallel with each other; a calculating device for calculating the widths of the elongated objects from the light quantities received by the pairs of light receiving elements.

The width measuring apparatus preferably further comprises: a plurality of calibration devices, in correspondence to the pairs of light receiving elements, for calibrating the pairs of the light receiving elements.

It is more preferable that the calibration devices include calibration gauges having a predetermined width, for calculating the light receiving elements by using measured values of the calibration gauges, in such a manner that after the light emitting elements and the pairs of light receiving elements are moved together to calibrating positions in correspondence to the plurality of sets where the calibration gauges are disposed and positioned thereat, the light receiving elements respectively receive each of pairs of partial laser beams of the laser beams at both edge portions of the laser beams from the light emitting elements, the partial laser beams, passing by the calibration gauges without being projected over the calibration gauges. And more preferably, the elongated object to be measured is a magnetic tape just after slitting.

To achieve the above first object, a first aspect of the present invention provides a width measuring apparatus which comprises; a single light emitting element located on one side of a plurality of elongated objects to be measured for projecting laser beams which expand in the width direction of the elongated objects to be measured so that the laser beams are projected to the entire width of at least two of the elongated objects traveling in parallel with each other; a plurality of pairs of light receiving elements located on another side of the elongated objects to be measured in correspondence thereto for respectively receiving each of pairs of partial laser beams of the laser beam from the light emitting elements, the partial laser beams, passing by the elongated objects without being shaded by the elongated objects, and for detecting the light quantities of the received partial laser beams; a measurement support table for fixing the plurality of pairs of light receiving elements disposed in parallel with each other in the width direction of the elongated objects to be measured; and a calculating devices for calculating the widths of the plurality of elongated objects to be measured from the respective light quantities received by the plurality of pairs of light receiving elements.

It is preferable that the laser beam from the light emitting element is expanded in a fan shape. And that the distribution of luminance of the laser beams projected by the light emitting element in the width direction of the elongated objects to be measured is uniform.

It is preferable that the calculating device performs a correction due to a distribution of luminance of the laser beams in the width direction thereof, which expand in the width direction of the elongated objects, for correcting the values of the width of the elongated object to be measured by using luminance values obtained from the distribution of luminance and positions in the width direction of the light receiving elements.

The width measuring apparatus further comprises; calibration devices in correspondence to the plurality of the pairs of light receiving elements, for calibrating the light receiving elements, then the calibration devices includes a plurality of calibration gauges having a predetermined width, in correspondence to the plurality of the elongated objects, for calculating the light receiving elements, in such a manner that after the pairs of light receiving elements are moved together to calibrating positions respectively where the calibration gauges are disposed and positioned thereat, the pairs of light receiving elements respectively receive each of pairs of partial laser beams of the laser beams from the light emitting element, the partial laser beams passing by the calibration gauge without being projected over the calibration gauge, and it is more preferably, the calibration devices perform a correction due to a distribution of luminance of the laser beams in the width direction thereof, which expand in the width direction of the calibration gauges, for correcting the measured value of the width of the calibration gauges by using luminance values obtained from the distribution of luminance and positions in the width direction of the light receiving elements at the calibrating positions.

It is preferable that the calculating devices measures the widths of the elongated objects to be measured by adding the respective light quantities of the partial laser beams received by the pairs of light receiving elements.

And preferably the width measuring apparatus, further comprises; cupping removing bars for removing the cupping of the elongated objects to be measured in travel, and provided forward and backward of the measurement support table, on which the light emitting element and the pairs of light receiving elements are fixed, in the traveling direction of the elongated objects to be measured. It is preferable that the elongated objects to be measured are magnetic tapes just after slitting.

DETAILED DESCRIPTION OF THE INVENTION

Figure 1:
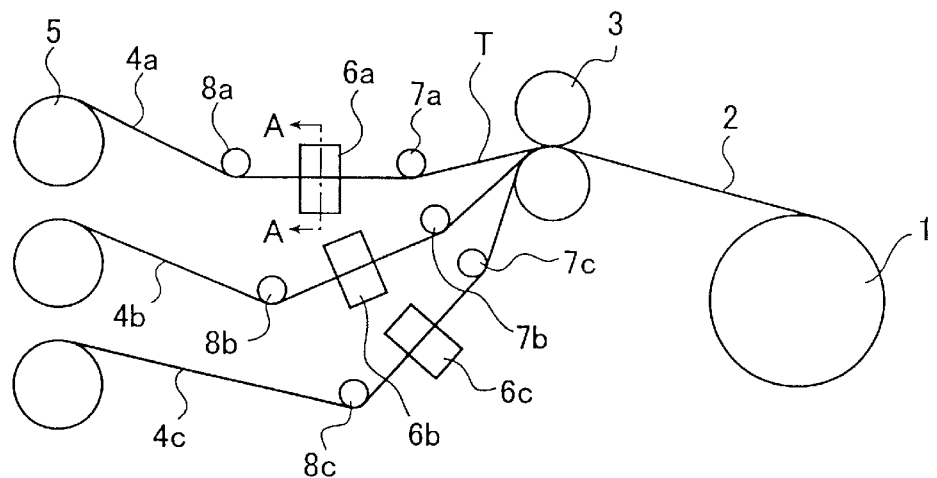
FIG. 1 is a front elevational view conceptually showing an example of a tape width measuring apparatus to which a width measuring apparatus of a first aspect of the present invention is applied.

A width measuring device according a first aspect of the present invention will be described in detail below with reference to a preferable example shown in the accompanying drawings. Note that when a plurality of the same parts and the same components are used, they are denoted by the same reference numerals, and when the same parts are disposed at different positions, they are identified from each other by the suffixes such as a, b, c, etc. attached to the reference numerals thereof.

Figure 2:
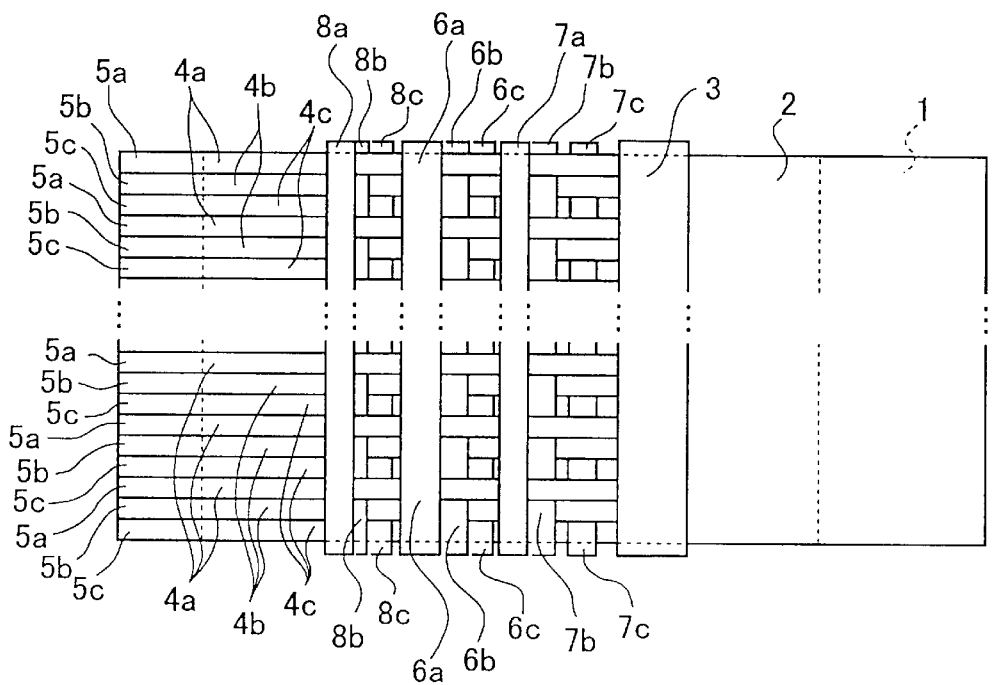
FIG. 2 is a plan view of the tape width measuring apparatus shown in FIG. 1.
Figure 3:
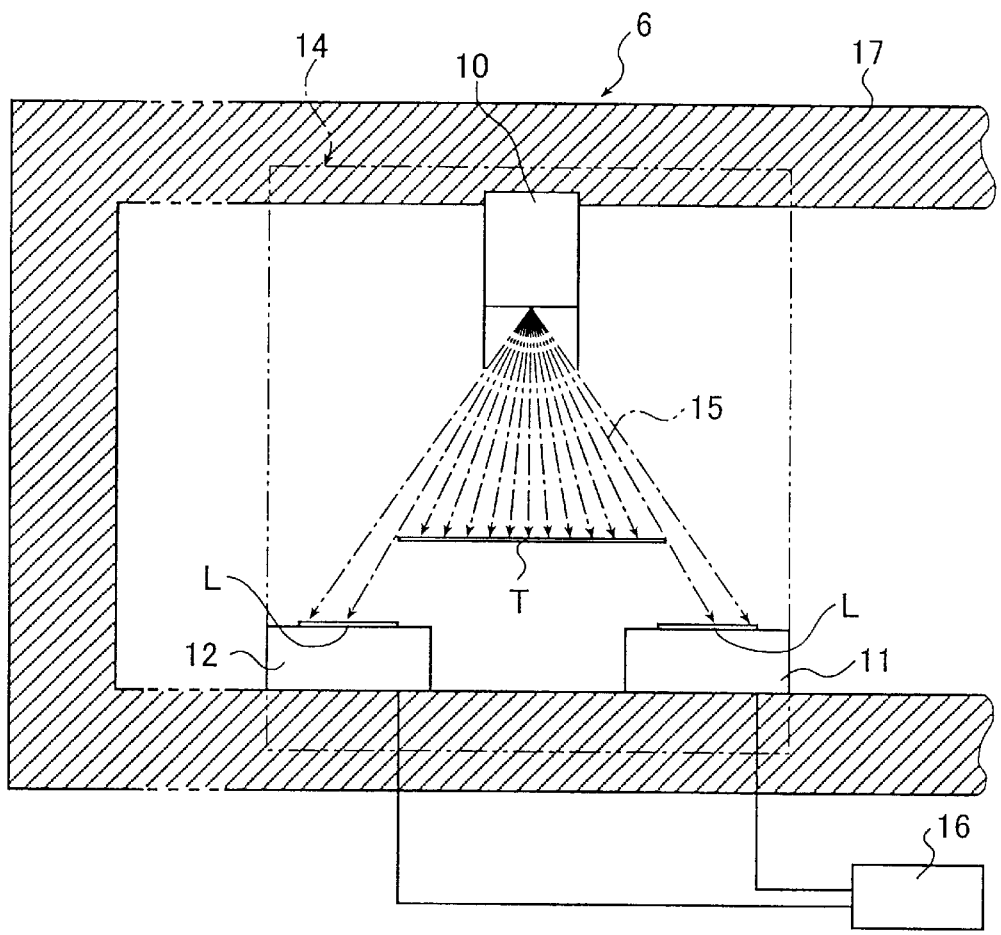
FIG. 3 is an A—A sectional view of FIG. 1 showing the main portion of a measuring block.
Figure 4:
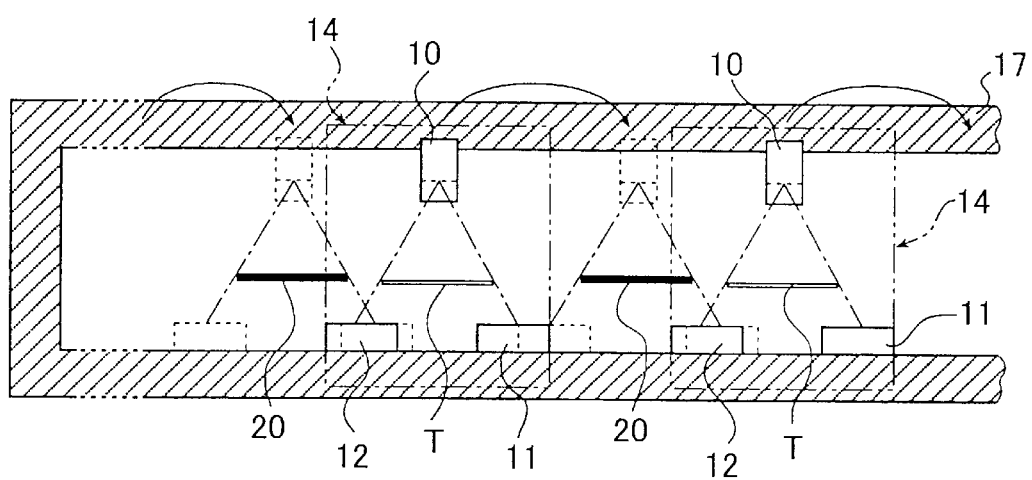
FIG. 4 is a sectional view showing an example of the measuring block calibrating method of the width measuring apparatus according to the first aspect of the present invention.

FIG. 1 is a front elevational view conceptually showing an example of a tape width measuring apparatus to which the width measuring apparatus according to the first aspect of the present invention is applied, FIG. 2 is a plan view of FIG. 1, FIG. 3 is an A—A sectional view of FIG. 1 showing the main portion of a measuring block, and FIG. 4 is a sectional view showing a calibrating method of the measuring block.

In the following description, an example, in which the width measuring apparatus according to the first aspect of the present invention is applied to the tape width measuring apparatus for measuring the tape widths of magnetic tapes and the like, will be described as a representative example. However, the present invention is by no means limited thereto.

As shown in FIG. 1, a slitter apparatus, to which the tape width measuring apparatus as an example of the width measuring apparatus according to the first aspect of the present invention is applied, is composed of a raw material winding roll 1, a slitter 3 and magnetic tape rolls 5. The raw material winding roll 1 winds a wide raw material 2 therearound such as a material of a magnetic tape or the like as to be used for a magnetic recording and reproducing apparatus such as a tape recorder, a VTR and the like. The magnetic tape rolls 5 are made from the wide raw material 2 which is drawn out from the roll 1, slit by a slitter 3 and wound therearound as respective magnetic tapes 4. Each of the magnetic tapes 4 is composed of a tape T which has a width of 12.650 mm when it is used as, for example, a VHS video tape.

Changes of the tape width of the tape T are managed within the range of ± several millimeters in accordance with the uses for them. The tape width measuring apparatus 6, which is used to confirm that the tape T is slit such that the changes of its width are within the allowable range, is disposed just forward or backward of the slitter 3.

As shown in the plan view of FIG. 2, the respective ones of a multiplicity of the magnetic tapes 4, which have been slit by the slitter 3 and travels in parallel with each other, are separated one by one to upper magnetic tapes 4a positioned on an upper stage, middle magnetic tapes 4b positioned on a middle stage and lower magnetic tapes positioned on a lower stage, and they are transported on the respective stages. Then, the changes of the tape widths of the tapes are detected by an upper stage tape width measuring unit 6a, a middle stage tape width measuring unit 6b and a lower stage tape width measuring unit 6c, respectively. Known cupping removing bars 7a, 7b and 7c, and 8a, 8b and 8c are disposed forward and backward of the tape width measuring units 6a, 6b and 6c to remove the cupping of the respective magnetic tapes 4a, 4b and 4c which is caused when the tape widths are measured.

The tape width measuring apparatus 6 will be described below in detail with reference to the drawings. FIG. 3 is a sectional view showing the main portion of a measuring block taken along a line A—A in the direction perpendicular to a tape traveling direction as shown in FIG. 1. In the figure, the tape width measuring apparatus 6 is composed of a laser element (a laser light source) 10 as a light emitting element disposed at an upper portion and a pair of photodiodes 11 and 12 as light receiving elements. The measuring block 14 is composed the laser element 10 and the pair of photodiodes 11 and 12 which are fixedly disposed as one set, where a measurement support table 17 is arranged.

The laser element 10 which has an optional lens converts laser beams generated thereby into fan-shaped laser beams 15 through a non-spherical collimator lens and a rod lens so that they are projected in a line-shape. The laser element 10 is fixed in the vertical direction at a position so that it projects the fan-shaped laser beams 15 in the width direction of the tapes T, that is, in the direction perpendicular to the traveling direction of the tape T (right to left direction in FIG. 3) and that the width of the projected fan-shaped laser beams 15 is a little larger than the width of the tape T.

The fan-shaped laser beams 15 is shaded by the tape T traveling between the laser element 10 and the pair of photodiodes 11 and 12 and only the partial laser beams of the laser beam projected to the outsides of the tape T reach the photodiodes 11 and 12 and the light quantities thereof are detected by the pair of photodiodes 11 and 12. The light quantities detected by the photodiodes 11 and 12 are supplied to a computer having a calculating device 16 and changes of the widths of the tape and the degree of straightness thereof are determined thereby as described below or the data of them is stored in a memory.

As shown in FIGS. 1 and 2, the tape width measuring apparatus 6 composed of a plurality of the measuring blocks 14 arranged as described above is disposed in correspondence to each of a plurality of the magnetic tapes 4 travelling in parallel with each other. That is, a plurality of measuring blocks 14 each composed of the laser element 10 and a pair of the photodiodes 11 and 12 are formed in correspondence to the upper magnetic tapes 4a positioned on the upper stage. The cupping removing bars 7a and 8a, which cover the entire width of the slitter apparatus, are disposed forward and backward of the upper stage tape width measuring unit 6a to prevent the occurrence of cupping to the tapes 4a at the position of the tape width measuring apparatus 6. Further, the cupping removing bars 7a and 8a also prevent the fluctuation of the tape surfaces of the magnetic tapes 4a in a vertical direction. Then, the magnetic tapes 4a having been measured by the upper stage tape width measuring unit 6a are wound around reels as the magnetic tape rolls 5a.

As to the middle stage tape width measuring unit 6b and the lower stage tape width measuring unit 6c, a plurality of measuring blocks 14 each composed of the laser element 10 and the pair of photodiodes 11 and 12 are also formed in correspondence to the respective middle magnetic tapes 4b located on the middle stage and the lower magnetic tapes 4c located on the lower stage likewise the upper stage tape width measuring unit 6a. Then, the cupping removing bars 7b and 8b and the cupping removing bars 7c and 8c, which cover the entire width of the slitter apparatus, are disposed forward and backward of the middle stage tape width measuring unit 6b and the lower stage tape width measuring unit 6c, respectively.

Note that, while the tape width measuring apparatus 6 is composed of the three stages of; the upper, middle, and lower stages, the present invention is by no means limited thereto and it may be composed of two stages, four stages and the like.

As apparent from FIG. 3, since the boundary lines L, along which the portions where the fan-shaped laser beams 15 are projected from the laser element 10 are separated from the portions where the laser beams 15 are not projected therefrom by being shaded by the tapes T, are positioned approximately at the centers of the light receiving elements of the photodiodes 11 and 12, the movements of the boundary lines L, that is, the fluctuations of the side edges of the tapes T can be detected as the changes of the amounts of received lights. When the pair of photodiodes 11 and 12 are arranged to have the same sensitivity and the outputs from both the photodiodes 11 and 12 are adjusted so that the changes of the voltages produced to the photodiodes 11 and 12 are in coincidence the changes of the light quantities caused by the movement of the boundary lines, there can be obtained the pair of photodiodes 11 and 12 which can accurately detect the fluctuations of the side edges of the tapes as the changes of the same quantities of voltages.

In the calculating device 16, on the other hand, the relationship between the tape widths of various tapes and the output voltages resulting from the light quantities of the partial laser beams received by the photodiodes 11 and 12 is previously determined by measurement (they are not always in a proportional relationship) and this determined relationship (hereinafter, referred to as a width-voltage relationship) is prepared and captured into the calculating device 16.

In this case, when the tape T is slightly moved, for example, rightward without the change of the width thereof, the quantity of light received by the right photodiode 11 is reduced and the voltage output therefrom is also reduced in correspondence to the amount of movement of the tape T. In contrast, since the quantity of light received by left photodiode 12 is increased in correspondence to the amount of movement of the tape T, the amount of light received by the left photodiode 12 is increased by the amount of light reduced in the left photodiode. Accordingly, since the voltage output from the left photodiode 12 is increased in correspondence to the amount of movement of the tape T, the same voltage as that reduced in the right photodiode 11 is increased in the left photodiode 12.

Further, when only the right side edge of the tape T moves rightward and the width of the tape T is increased by the amount of movement, only the output from the right photodiode 11 is reduced in correspondence to the amount of movement and the output from the left photodiode 12 is not changed.

With this arrangement, that the tape width of the tape T after slitting can be actually measured by capturing the voltages output from the photodiodes 11 and 12 to the calculating device 16 and using the above width-voltage relationship.

That is, in the tape width measuring apparatus 6, the amount of changes of the width of the tape T can be determined by adding the output from the right photodiode 11 and the output from the left photodiode 12 through the calculating device 16 and using the above width-voltage relationship. Further, the amount of leftward movement of the center of the tape T can be also determined based on the value which is determined by subtracting the output from the left photodiode 12 from the output from the right photodiode 11 and dividing the resulting value by 2. It is needless to say that the amount of movement of the right or left side edge of the tape T (degree of straightness of the side edges of the tape) can be also determined by adding or subtracting one half the width of the tape T to and from the amount of movement of the center of the tape T. Then, the measured values are sampled at a predetermined time interval, for example, each 2 milliseconds, and output as the actually measured values of a tape width and a degree of straightness are calculated or stored in the memory through the computer.

The tape width measuring apparatus 6 of the example can be manufactured at a very low cost because it employs the semiconductor laser element for projecting the fan-shaped laser beam as the light emitting element and the photodiodes as the light receiving elements. Since the less expensive parts are used as the components of the tape width measuring device 6, however, it cannot be avoided that an error is caused in measured values depending upon external environments. Therefore, the laser element 10 preferably includes an APC (Automatic Power Control) function excellent in luminance stability. In particular, since the characteristics of the photodiodes are changed by temperature, an error is caused in the measured values when an environmental temperature changes while the tape width measuring device 6 is continuously operated for a long period of time.

To prevent the error, in the tape width measuring apparatus 6 of the example, the photodiodes 11 and 12 of the respective measuring blocks 14 are calibrated in one go while the error of the measured values is within an allowable range as shown in FIG. 4. In the figure, the positions of the laser elements 10 and the photodiodes 11 and 12 drawn by solid lines are drawn at the positions where the widths and the degrees of straightness of the tapes T are measured, and a plurality of the measuring blocks 14 formed of the laser elements 10 and the photodiodes 11 and 12 are disposed in correspondence to a plurality of the tapes T.

Note that, according to the description in FIG. 3, one set of the laser element 10 is disposed with respect to one piece of the tapes T having been slit and the laser beams projected therefrom has the fan-shape. However, the present invention is not always limited thereto and the laser beams may be projected in the shape shown in, for example, FIG. 5, or the laser beams emitted from one set of the laser element may be projected to a plurality of the tapes T.

Reference gauges 20 acting as calibration gauges are fixed on the right sides of the plurality of tapes T to correct the values measured by the respective measuring block 14 by calibration. Each of the reference gauges 20 is shaped such that a width of the reference gauge 20 is in correct coincidence with the width (reference size) of the tape having been slit and when necessary the error thereof is also stored in the not shown computer. The measuring blocks 14 are lifted all together by the movement of the measurement support table 17 at predetermined intervals, each time the tapes T have been wound around reels or at intervals of several minutes to several dozens of minutes while interrupting the measurement of the tapes T. Then, the measuring blocks 14 are moved rightward to the calibrating positions drawn by imaginary lines.

Each of the calibrating positions is a position, which is set such that a relative position of the reference gauge 20 to the measuring block 14, which is composed of the light emitting unit and the pair of light receiving elements, reached by the movement of the measurement support table 17 is in coincidence with a relative position of the tape T to the measuring block 14 when the tape T is measured and that the reference gauge 20, which is disposed in a range where the measured value of the tape T is not affected in the measurement of the width thereof. Then, the width of the reference gauge 20 is measured similarly to the measurement of the tape T and the calibration is carried using the measured value as the reference width of the tape width (when the error of the reference gauge is stored, the reference width is corrected for the error).

Note that the calibration is carried out by the movement of the measurement support table 17 to the calibrating position as a calibration means. However, the calibration may be carried out by fixing the measurement support table in the calibration and moving the reference gauge to the position of the tape T being transported. With this arrangement, the calibration can be carried out without moving the light emitting unit and the pair of light receiving elements. Note that, it is necessary in this case to move the tape T so that it is not caused to come into contact with the reference gauge when it is moved.

The calibration is carried out by the calibration devices in such a manner that the fan-shaped laser beams are projected from the laser element 10 to the reference gauge 20 having the predetermined width, the partial laser beams at both the side edge portions of the projected laser beam which are not shaded by the reference gauge 20 are received by the photodiodes 11 and 12, respectively, and a calibration voltage is obtained by adding the voltages output from the photodiodes 11 and 12 and stored in the calculating device 16. Since the calibration voltage corresponds to the reference size of the reference gauge 20, the deviation of the voltage obtained in the measurement of the tape, which is performed subsequently, from the calibration voltage is used as the deviation of the width of the tape from the reference size, whereby the tape width is calibrated.

In the example, since the calibration is repeatedly carried out at the short intervals, even if the characteristics of the photodiodes are changed by the external environments, in particular, by a temperature change, the calibration can be carried out before measured values are adversely affected thereby.

The widths of magnetic tapes slit by a slitter in simulation were measured using the tape width measuring apparatus 6. Thereafter, the tape widths of the same magnetic tapes were measured using the conventional laser length measuring unit 50.

Specifically, a wide magnetic tape was slit to a plurality of magnetic tapes each having a width of ½ inch and sequentially diverted to an upper stage, a middle stage and a lower stage. As a result, in the slitting in the simulation, the magnetic tapes of the respective stages traveled at intervals of ³⁄₂ inches and the reference gauge 20 having a width of ½ inch was interposed between the magnetic tapes traveling at the intervals of ³⁄₂ inches.

A commercially available laser element which projected laser beams in a fan-shape was used as the laser element 10 and commercially available photodiodes were also used as the photodiodes 11 and 12. The distance between the laser element 10 and the magnetic tape was set to 30 mm and the distances between the magnetic tape and the photodiodes 11 and 12 were set to 15 mm.

The sampling time, at which the tape width measuring apparatus 6 measured the tape widths, were set to 2 milliseconds and measured data was supplied to the computer as the calculating device 16. On the other hand, the tape widths of they magnetic tapes having been slit were measured at the same positions as those measured by the tape width measuring apparatus 6 using the conventional laser length measuring unit 50.

As a result, the average value of the tape widths of the tapes measured by the tape width measuring apparatus 6 was 12.646 mm and the fluctuation of the widths was 0.0034 mm. In contrast, the average value of the tape widths of the tapes measured by the conventional laser length measuring unit 50 was 12.646 mm and the fluctuation of the widths was 0.0036 mm. Thus, the averages values of the tape widths and the fluctuation of the tape widths measured by both the measuring apparatuses were substantially in coincidence with each other, and it was determined that the tape widths were within an allowable range.

Further, when the tape widths of magnetic tapes, which were slit in simulation so that the fluctuation of the tape widths were set outside of the allowable range, were measured by the tape width measuring apparatus 6, the average value of the tape widths was 12.645 mm and the fluctuation of the tape widths was 0.0084 mm. In contrast, when the tape widths were measured by the conventional laser length measuring unit 50, the average value of the tape widths was 12.644 mm and the fluctuation of the tape widths was 0.0084 mm. Thus, the average values of the tape widths and the changes thereof measured by both the measuring apparatuses were approximately in coincidence with each other, and it was evaluated that the tape widths were out of the allowable range.

It is apparent from the above simulation that the fluctuation of a tape widths can be measured using the tape width measuring apparatus 6 as accurately as that measured by the conventional laser length measuring apparatus.

Next, a width measuring apparatus according to a second aspect of the present invention will be described in detail with reference to a preferable example shown in the accompanying drawings. Note that when a plurality of the same parts and the same components are used, they are denoted by the same reference numerals, and when the same parts are disposed at different positions, they are identified from each other by the suffixes such as a, b, c, etc. attached to the reference numerals thereof.

Figure 5:
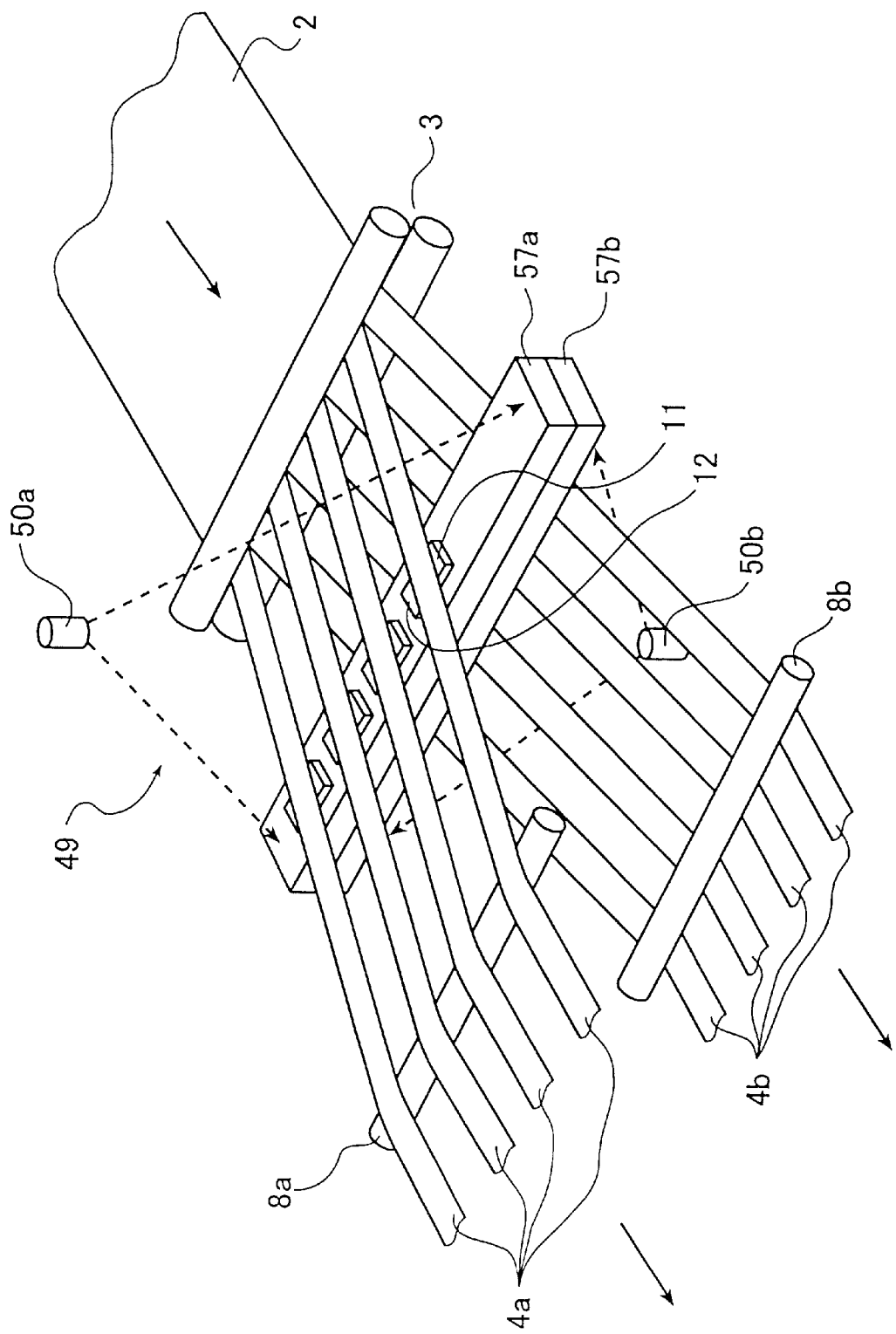
FIG. 5 is a perspective view conceptually showing an example of the tape width measuring apparatus to which a width measuring apparatus according to a second aspect of the present invention is applied.
Figure 6:
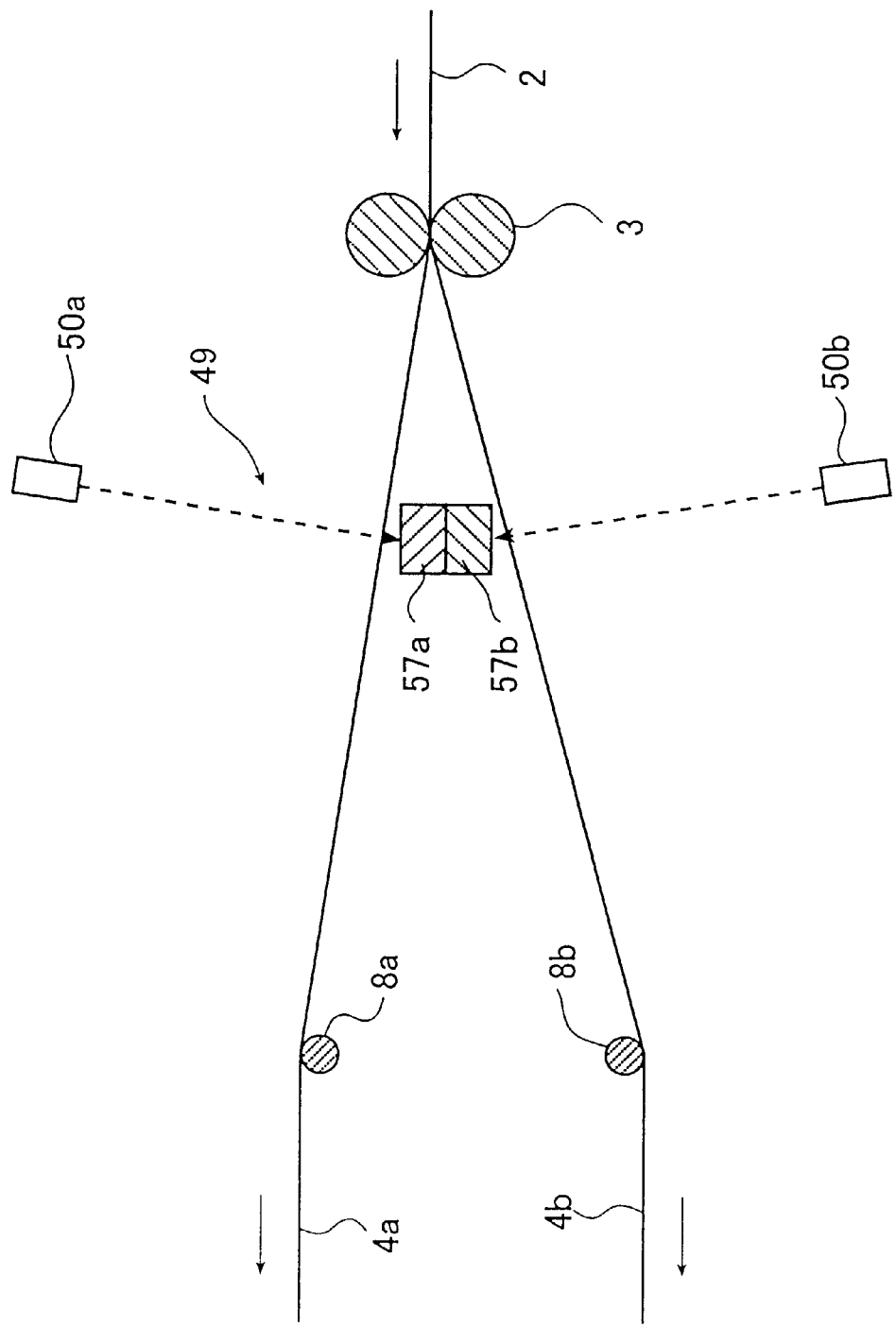
FIG. 6 is a sectional view of the tape width measuring apparatus shown in FIG. 5.
Figure 7:
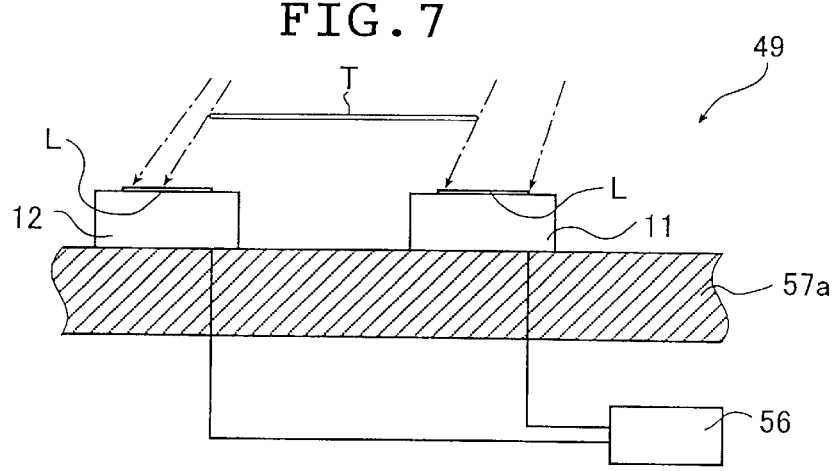
FIG. 7 is a sectional view showing the main portion of the light receiving elements of the tape width measuring apparatus shown in FIG. 5.
Figure 8:
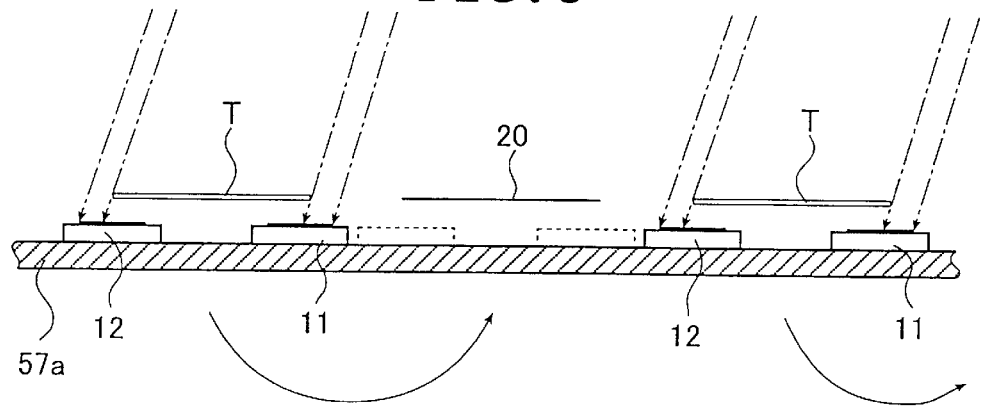
FIG. 8 is a sectional view showing an example of the measuring block calibrating method of the width measuring apparatus according to the second aspect of the present invention.

FIG. 5 is a perspective view showing an example of a tape width measuring apparatus to which the width measuring apparatus of the second aspect according to the present invention is applied, FIG. 6 is a sectional view of the tape width measuring apparatus shown in FIG. 5, FIG. 7 is a sectional view showing the main portion of a pair of light receiving elements, and FIG. 8 is a sectional view showing a calibration method of the pair of light receiving elements.

Note that while an example, in which the width measuring apparatus according to the second aspect of the present invention is applied to the tape width measuring apparatus for measuring the tape widths of magnetic tapes and the like, is described as a representative example similarly to the width measuring apparatus of the first aspect, the present invention is by no means limited thereto.

In the tape width measuring apparatus as the example of the width measuring apparatus according to the second aspect of the present invention, the sections and components which have the same arrangements and functions as those of the tape width measuring apparatus 6 of the width measuring apparatus according to the first aspect of the present invention are denoted by the same numerals as used in the first aspect.

A slitter apparatus, to which the tape width measuring apparatus 49 shown in FIG. 5 is applied, slits a wide raw material 2, which is wound around a raw material roll and drawn out therefrom, with a slitter 3 to tapes T such as magnetic tapes and the like having a width of 12.650 mm, when the tapes are used as VHS video tapes. Then, the tapes are wound as magnetic tape rolls of respective magnetic tapes 4. The slitter apparatus shown in FIG. 5 transports upper magnetic tapes 4a and lower magnetic tapes 4b which are diverted to an upper stage and a lower stage, different from the slitter apparatus shown in FIGS. 1 and 2. However, the slitter apparatus may transport the magnetic tapes by diverting them to three stages, that is, upper, middle and lower stages or to four stages.

The tape width measuring apparatus 49 includes a laser element 50 (laser elements 50a and 50b), a plurality of pairs of photodiodes, a measurement support table 57 (measuring support tables 57a and 57b), and a calculating device 56 (see FIG. 7). The laser element 50 (50a, 50b) is positioned on one sides of a plurality of the magnetic tapes 4 (upper magnetic tapes 4a and lower magnetic tapes 4b) which are slit by the slitter 3 and travel in parallel with each other and project laser beams in fan-shape in ranges wider than the widths of the magnetic tapes 4 in the width direction thereof. The plurality of pairs of photodiodes, which are positioned on the other sides of the magnetic tapes 4, are composed of photodiodes 11 and 12 with each pair of them corresponding to each of the plurality of magnetic tapes 4. Each pair of the photodiodes 11 and 12 receive the fan-shaped laser beams at both the side edges of the magnetic tape 4 which are projected from each of the laser elements 50a and 50b and are not shaded by the magnetic tape 4 and detect the light quantities of the thus received laser beams. The measurement support tables 57a and 57b fix the plurality of pairs of photodiodes thereon in parallel with each other in the width direction of the magnetic tapes 4. The calculating device 56 calculates the widths of the magnetic tapes 4 from the respective light quantities received by the pairs of the photodiodes.

The difference between the arrangement of the tape width measuring apparatus 49 shown in FIG. 5 and that of the tape width measuring apparatus 6 shown in FIG. 1 resides in the laser element 50, the calculating device 56 and the measurement support table 57, and the other sections and components of the tape width measuring apparatus 49 are the same as those of the tape width measuring apparatus 6. Thus, the description of the arrangement and function of the similar portions of the tape width measuring apparatus 49 are omitted.

The laser element 50a shown in FIG. 5, which emits the laser beams expanding in a rectangular sectional shape and in a fan shape, is disposed above the magnetic tapes 4a and projects the laser beams in the fan-shape. The laser element 50a is positioned apart from the magnetic tapes 4 by a predetermined distance, for example, several tens of centimeters as shown in FIG. 6 in order to uniformly project the laser beams to the entire width of the plurality of magnetic tapes 4a which are slit into by the slitter 3 and diverted to the upper stage and travel in parallel with each other. As to the plurality of magnetic tapes 4b which are slit into by the slitter 3 and travel by being diverted to the lower stage, the laser element 50b is positioned below the magnetic tapes 4b apart therefrom a predetermined distance, for example, several tens of centimeters as shown in FIG. 6 so that the laser beams projected therefrom are uniformly projected to the entire width of the magnetic tapes 4b.

Any laser element capable of projecting laser beams, which expand in the fan-shape and have luminance uniform in the expanding direction thereof, may be used as the laser elements 50a and 50b which can uniformly project the laser beams to the plurality of magnetic tapes 4a and 4b travelling in parallel with each other on the upper and lower stages, and the like.

Since the laser element 50 is disposed apart from the magnetic tapes 4 by, for example, several tens of centimeters as described above, a sufficient working space can be secured above the magnetic tapes 4a and a sufficient working space can be also secured below the magnetic tapes 4b.

With this arrangement, even if any of the magnetic tapes is cut off, an operator can make repairs such as the connection of the magnetic tape having been cut off and the like. Further, while it is conventionally necessary to modify magnetic tape transportation passages themselves for the measurement of width, the modification is also made unnecessary.

The measurement support table 57a shown in FIGS. 7 and 8 are provided with a plurality of pairs of photodiodes 11 and 12 in correspondence to the respective ones of the plurality of magnetic tapes 4a travelling in parallel with each other. As shown in FIG. 7, these pairs of photodiodes 11 and 12 receive a pair of partial laser beams of the laser beam, which are uniformly projected from the laser element 50a and are not shaded by the plurality of magnetic tapes 4 travelling in parallel with each other, obtain output voltages representative of the tape widths of the respective magnetic tapes 4a and supply the output voltages to the calculating device 56. The measurement support table 57b also includes a plurality of pairs of photodiodes 11 and 12 which are disposed in correspondence to the respective ones of the plurality of the magnetic tapes 4b likewise the measuring support table 57a.

That is, in the tape width measuring apparatus 49, each one of the laser elements 50a and 50b is disposed to each of the upper and lower stages of the magnetic tapes 4 which have been slit by the slitters 3 and diverted to the upper and lower stages so that the laser elements 50a and 50b uniformly project the laser beams to the magnetic tapes 4 of the respective stage in the width direction thereof. In contrast, in the tape width measuring apparatus 6, the plurality of sets of laser elements 10 and the pairs of photodiodes 11 and 12, in which each set is composed of one laser element 10 and a pair of photodiodes 11 and 12, are fixed on the measurement support table 17 in parallel with each other in correspondence to the respective ones of the plurality of magnetic tapes 4 traveling in parallel with each other.

As a result, in the tape width measuring apparatus 49, when a wide raw material tape is slit by the slitter 3 into one hundred and several dozens of the magnetic tapes 4 and at the same time the widths of all the magnetic tapes 4 are measured, it is sufficient to provide, for example, only one laser element to each of the upper and lower stages. That is, in the tape width measuring apparatus 49, the number of the laser elements to be used is greatly smaller than the number of the laser elements required in the tape width measuring apparatus 6, whereby the manufacturing cost o the tape width measuring apparatus 49 can be more reduced and the structure of the apparatus 49 can be simplified.

The calculating device 56 shown in FIG. 7 has the same arrangement and the same function as those of the calculating device 16. That is, the calculating device 56 adds the voltage output from the right photodiode 11 and the voltage output from the left photodiode 12 and can determine the tape width of a tape T using a width-voltage relationship, which is previously obtained, in the same way as the tape width measuring apparatus 6. Incidentally, even if the tape T has the same tape width, the output voltages obtained from the photodiodes 11 and 12 are varied by the slightly uneven distribution of the luminance of laser beams. To correct the variation, the calculating device 56 subjects the output voltages supplied from the photodiodes 11 and 12 to a processing of a correction due to a distribution of luminance.

Figure 9:
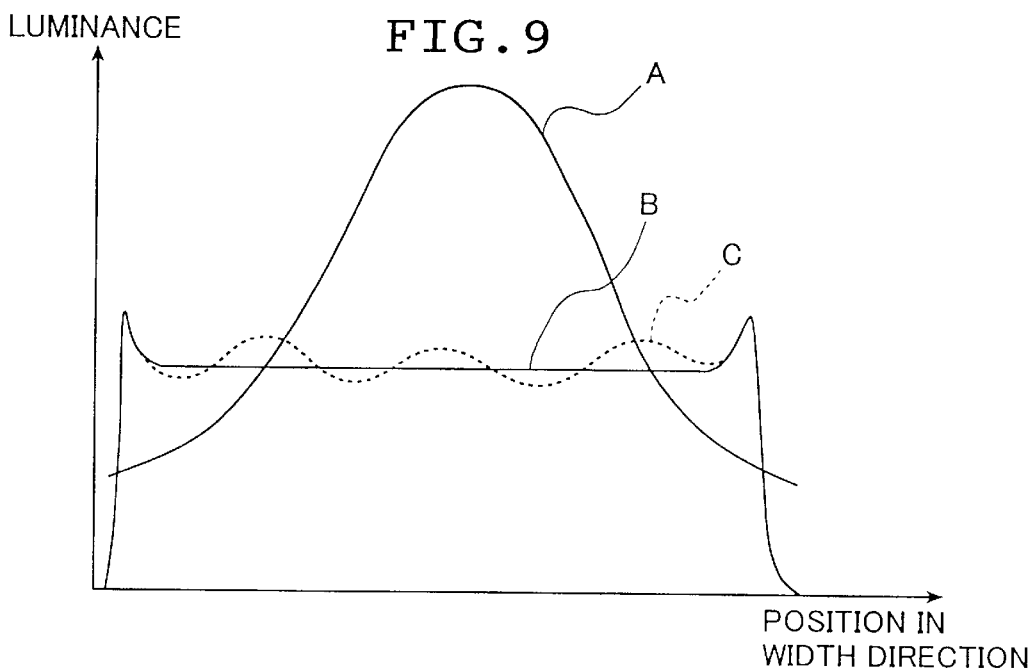
FIG. 9 is a view explaining the distribution of luminance of the laser beams which are used in the width measuring apparatus according to the second aspect of the present invention and extend in a fan shape.

That is, while it is preferable that the luminance of the laser beams projected from the laser element 50 is uniformly distributed except for both the ends in the distribution as shown in distribution of luminance B of FIG. 9, some of the laser beams are slightly unevenly distributed as shown in distribution of luminance C. In this case, even if the magnetic tape has the same width, the voltages output from the photodiodes 11 and 12 are changed in correspondence to the distribution of luminance. To cope with this problem, a luminance value is obtained by acquiring the distribution of luminance and knowing the positions of the photodiodes 11 and 12 used for measurement and the voltages output therefrom are corrected based on the luminance value.

In the tape width measuring apparatus 6 as the example of the first aspect of the present invention, the laser element 10 and the pair of photodiodes 11 and 12 are fixedly disposed in correspondence to each of the magnetic tapes 14 and thus the positional relationship therebetween is not changed. Accordingly, the tape width measuring apparatus 6 can determine the tape widths of the tapes 4 directly using the width-voltage relationship without taking the distribution of luminance of the laser beams into consideration even if the luminance of the laser beams is in so-called Gaussian distribution in which luminance is high at the center of the laser beams and low in the peripheries thereof.

In the tape width measuring apparatus 49 as the example of the second aspect of the present invention, however, when the luminance of the laser beams projected from the laser element 50 is unevenly distributed even if slightly as shown by the distribution of luminance C, the luminance of the projected laser beams is changed depending upon the positions of the photodiodes 11 and 12 with respect to the laser element 50. The reason is that the laser element 50 is not disposed to each of the pairs of photodiodes 11 and 12 and the only one laser element 50 is disposed to the plurality of pairs of photodiodes 11 and 12, while the pairs of the photodiodes 11 and 12 are disposed at the predetermined positions on the measurement support table 57 (57a, 57b) in correspondence to the respective ones of the magnetic tapes 4. As a result, even if the projecting surfaces of the laser beams projected to the photodiodes 11 and 12 have the same areas, the voltages output from the photodiodes 11 and 12 are changed because the laser beams have different luminance, whereby even the same tape width is measured as a different tape width.

It is for this reason that the changes of the voltages output from the photodiodes 11 and 12, which are caused by the uneven distribution of the luminance of the laser beams, are corrected. Note that when the luminance of the laser beams projected from the laser element 50 is uniformly distributed as shown by the distribution of luminance B, the correction of the distribution of luminance can be omitted, whereby the calculating device 56 can be simplified.

Further, the measurement support table 57 is provided with a calibration unit for calibrating the pairs of photodiodes 11 and 12 similarly to the tape width measuring apparatus 6 in order to prevent the occurrence of errors in measured values which would be otherwise caused by external environments such as, for example, an external temperature and the like.

That is, in the tape width measuring apparatus 49, the values measured by the plurality of photodiodes 11 and 12 disposed in parallel with each other are corrected all together by a calibration while the errors of the measured values are within an allowable range as shown in FIG. 8.

Reference gauges 20 serving as calibration gauges for correcting the measured values of the respective photodiodes 11 and 12 are fixed on the right sides of the plurality of tapes T traveling in parallel with each other in a similar fashion as the tape width measuring apparatus 6. The photodiodes 11 and 12 are lifted all together at one time by the movement of the measurement support table 57, and moved in the direction of arrows shown in FIG. 8 and positioned at calibrating positions. Then, the widths of the reference gauges 20 are measured similarly to the measurement of the tapes T and the measured tape widths are calibrated using the measured values of the reference gauges 20 as the reference sizes of the tape widths.

In the calibration, calibration voltages as output voltages may be subjected to the correction due to the distribution of luminance similarly to the measurement of the tape widths. In this case, the correction is carried out using luminance values at the calibrating positions of the photodiodes 11 and 12 which detect light quantities at the calibrating positions.

The tape width measuring apparatus 49 is arranged differently from the tape width measuring apparatus 6 in the above points.

The operation of the tape width measuring apparatus 49 which is different from that of the tape width measuring apparatus 6 will be described below.

The tape width measuring apparatus 49 is basically arranged such that the pairs of photodiodes 11 and 12, which are disposed in correspondence to the plurality of magnetic tapes 4 traveling in parallel with each other, obtain output voltages representative of the light quantities of a pair of partial laser beams projected outside the ends of the magnetic tapes 4 without being shaded by the magnetic tapes 4; then, the tape widths of the magnetic tapes 4 are determined from the output voltages using the above width-voltage relationship obtained previously as well as the pairs of photodiodes 11 and 12 are calibrated by the calibrating unit by moving the measurement support table 57 to the calibrating positions at each predetermined interval.

In the above operation, when the luminance of the laser beams is slightly unevenly distributed as shown in the distribution of luminance C shown in FIG. 9, the output voltages as the output signals obtained by the pairs of photodiodes 11 and 12, which are disposed in correspondence to the magnetic tapes 4, are corrected using the luminance values obtained from the distribution of luminance.

That is, the distribution of luminance of the laser beams emitted by the laser element 50 (50a, 50b) used in the tape width measuring apparatus 49 is previously found by being measured with, for example, a commercially available luminance meter and previously stored in the calculating device 56. The luminance values of the photodiodes 11 and 12, which output the voltages representative of received light quantities, in the distribution of luminance are obtained from the positions of the photodiodes 11 and 12 in the width direction of the magnetic tapes 4 with respect to the laser element 50. Then, the output voltages are corrected by using the deviation of the obtained luminance value from the predetermined luminance value.

Thereafter, the output from the right photodiode 11 is added to the output from the left photodiode 12 and tape widths are determined as measured values using the width-voltage relationship determined in a similar fashion as the tape width measuring apparatus 6.

The above correction due to the distribution of luminance is also carried out in the calibration when the reference gauges 20 are measured, in addition to the measurement of the tape widths.

In the tape width measuring apparatus 46, the photodiodes 11 and 12 are calibrated by moving only the measurement support table 57 to the calibrating positions without moving the laser element 50. However, the laser element 50 may be moved to the calibrating position together with the movement of the measurement support table 57. In this case, since the laser element 50 is moved together with the measurement support table 57, the output voltages in calibration can be corrected using the luminance values which are used when the tapes T are measured without using the luminance values of the laser beams at the calibrating positions of the photodiodes 11 and 12, whereby a troublesome operation in the correction of the distribution of luminance can be eliminated.

Further, in the tape width measuring apparatus 49, the magnetic tapes 4 are diverted to the upper stage and the lower stage and each one laser element is disposed to each stage. However, the number of the laser elements is not necessarily one and a plurality of them may be disposed to each stage. For example, when the raw material has a large width before it is slit, a plurality of laser elements such as two, three or more laser elements may be disposed in the width direction of the magnetic tapes 4 in parallel with each other. In this case, while the number of the laser elements is increased, the number of them disposed is up to 10, and thus it is still possible to reduce a cost.

Figure 10:
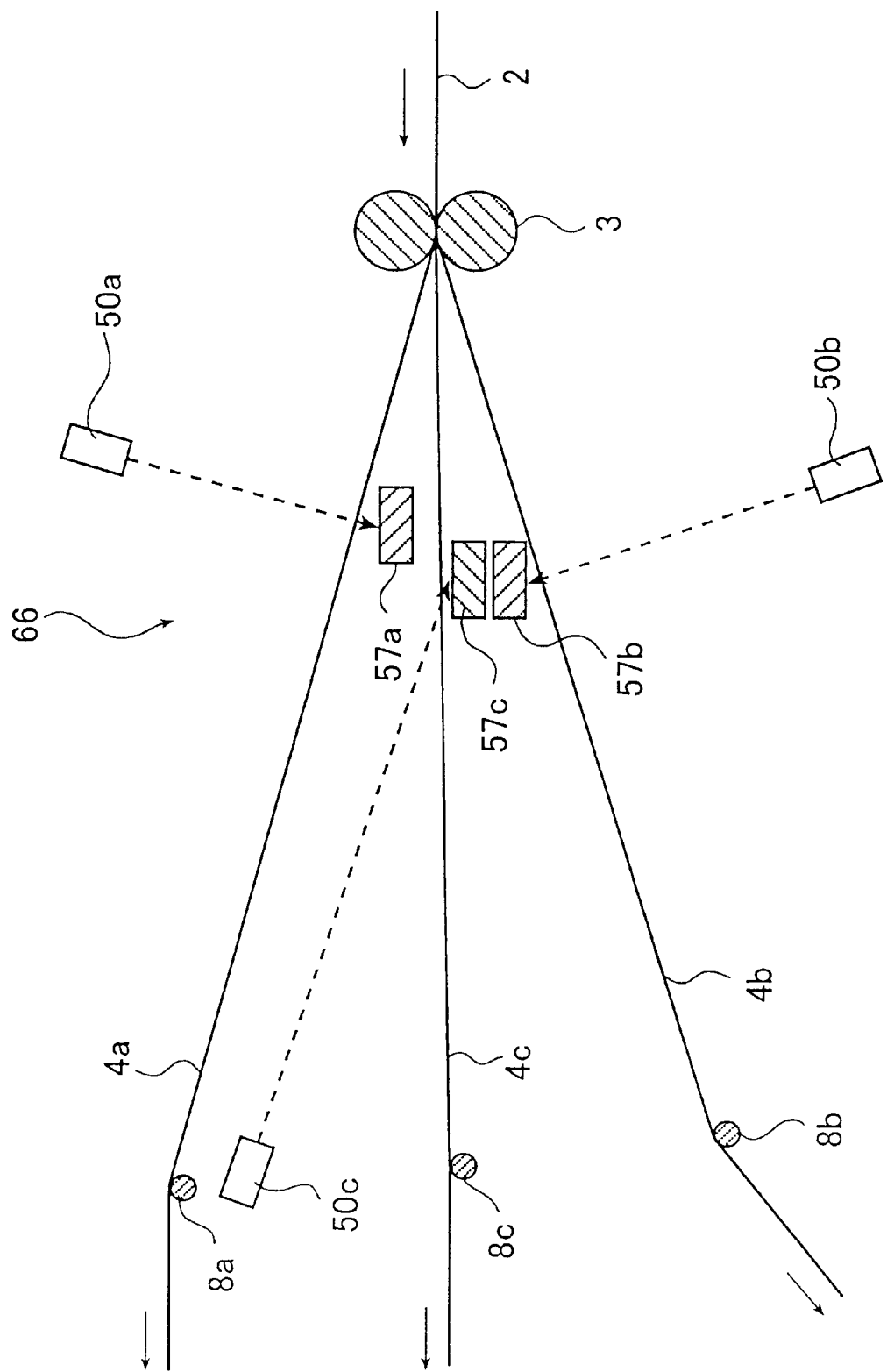
FIG. 10 is a sectional view conceptually showing another example of the tape width measuring apparatus to which the width measuring apparatus according to the second aspect of the present invention is applied.

FIG. 10 shows a sectional view of a slitter apparatus to which the tape width measuring apparatus 49 is applied, in which magnetic tapes 4 having been slit are transported by being diverted to three stages, that is, upper, middle and lower stages.

In this case, since a laser element 50c used for magnetic tapes 5c on the middle stage is sandwiched between magnetic tapes 4a and magnetic tapes 4c, a sufficient distance cannot be obtained in an up and down direction between the magnetic tapes 4a and the magnetic tapes 4c in FIG. 10. As shown in FIG. 10, however, the laser element 50c can be disposed apart from a measurement support table 57c in the traveling direction of the magnetic tapes 4c (on the left side in the figure) so as to project laser beams obliquely to the magnetic tapes 4c. The reason that the laser element 50c is permitted to project the laser beam from the laser element 50c in the oblique direction is that the laser beam expanding in the travelling direction of the magnetic tapes 4 has a small thickness such as several tens of micrometers, which is greatly smaller than their width of, for example, 30 centimeters which expands in the width direction of the magnetic tapes in a fan-shape and thus even if the laser beams are projected in the oblique direction, the light quantities detected by photodiodes 11 and 12 are not affected.

The disposition of the laser element 50c backward of the measurement support table 57c in the traveling direction of the magnetic tapes 4c (in the left direction in the figure) permits a working space to be secured between the magnetic tapes 4a and 4c. As a result, even if any of the magnetic tapes 4c is cut off while it is slit, an operator can make repairs such as the connection of the magnetic tape having been cut off. Further, while it is conventionally necessary to modify magnetic tape transportation passages themselves for the measurement of width, the modification is also made unnecessary.

The above examples has been described as to the tape-like objects such as the magnetic tapes and the like as representative elongated objects to be measured by the width measuring apparatus of the present invention. However, the present invention is not limited thereto and when the wavelength of the laser beams emitted from a light emitting element is properly selected, for example, laser beams having a specific wavelength are selected to avoid photosensitization, various kinds of films and tape-like objects including light-sensitive films, strip-like members such as fabrics and paper, steel strips and the like, wire members such steel wires, copper wires, and the like may be used as the elongated objects to be measured, in addition to the magnetic tapes. Further, the elongated objects may be measured through the diameter or thickness thereof, in addition to the width thereof.

Further, an optical system for correcting the fan-shaped laser beams to parallel laser beams may be interposed between the light emitting element and the objects to be measured. The provision of the parallel laser beams increases a degree of freedom in design as to the distance between the light emitting element and the objects to be measured. Further, when the parallel laser beams are used, unnecessary laser beams are received incidentally by the light receiving elements from an oblique direction which is caused when the laser beams expanding in the fan-shape are used.

While the width measuring apparatus of the present invention has been described above in detail by means of the tape width measuring apparatus, the present invention is by no means limited to the above examples and it goes without saying that various improvements and modifications can be made within the range which does not depart from the gist of the invention.

What is claimed is:

1. A width measuring apparatus, comprising:

a single light emitting element located on one side of a plurality of travelling elongated objects to be measured for projecting laser beams which expand in the width direction of the elongated objects to be measured so that the laser beams are projected to the entire width of at least two of the elongated objects traveling in parallel with each other;

a plurality of pairs of light receiving elements located on another side of the elongated objects to be measured in correspondence thereto for respectively receiving each of pairs of partial laser beams of the laser beam from the light emitting elements, the partial laser beams, passing by the elongated objects without being shaded by the elongated objects, and for detecting the light quantities of the received partial laser beams;

a measurement support table for fixing the plurality of pairs of light receiving elements disposed in parallel with each other in the width direction of the elongated objects to be measured; and a calculating device for calculating the widths of the plurality of elongated objects to be measured from the respective light quantities received by the plurality of pairs of light receiving elements.

2. The width measuring apparatus according to claim 1, wherein the laser beam from the light emitting element is expanded in a fan shape.

3. The width measuring apparatus, according claim 1, wherein the distribution of luminance of the laser beams projected by the light emitting element in the width direction of the elongated objects to be measured is uniform.

4. The width measuring apparatus, according claim 1, wherein the calculating device performs a correction due to a distribution of luminance of the laser beams in the width direction thereof, which expand in the width direction of the elongated objects, for correcting the values of the width of the elongated object to be measured by using luminance values obtained from the distribution of luminance and positions in the width direction of the light receiving elements.

5. The width measuring apparatus according to claim 1, further comprising: calibration devices in correspondence to the plurality of the pairs of light receiving elements, for calibrating the light receiving elements.

6. The width measuring apparatus according to claim 5, wherein said calibration devices includes a plurality of calibration gauges having a predetermined width, in correspondence to the plurality of the elongated objects, for calibrating the light receiving elements by using measured values of the calibration gauges, in such a manner that after the pairs of light receiving elements are moved together to calibrating positions respectively where the calibration gauges are disposed and positioned thereat, the pairs of light receiving elements respectively receive each of pairs of partial laser beams of the laser beams from the light emitting element, the partial laser beams passing by the calibration gauge without being projected over the calibration gauge.

7. The width measuring apparatus according to claim 6, the calibration devices perform a correction due to a distribution of luminance of the laser beams in the width direction thereof, which expand in the width direction of the calibration gauges, for correcting the measured values of the widths of the calibration gauges by using luminance values obtained from the distribution of luminance and positions in the width direction of the light receiving elements at the calibrating positions.

8. The width measuring apparatus according to claim 1, wherein the calculating device measures the widths of the elongated objects to be measured by adding the respective light quantities of the partial laser beams received by the pairs of light receiving elements.

9. The width measuring apparatus according to claim 1, further comprising: cupping removing bars for removing the cupping of the elongated objects to be measured in travel, and provided forward and backward of the measurement support table, on which the pairs of light receiving elements are fixed, in the traveling direction of the elongated objects to be measured.

10. The width measuring apparatus according to claim 1, wherein the elongated objects to be measured are magnetic tapes just after slitting.

* * * * *